US012768016B2

(12) United States Patent
Suri et al.

(10) Patent No.: US 12,768,016 B2
(45) Date of Patent: Oct. 20, 2026

(54) THREE-DIMENSIONAL PRINTING WITH STAINLESS STEEL PARTICLES

(71) Applicant: PERIDOT PRINT LLC, Palo Alto, CA (US)

(72) Inventors: Pavan Suri, Corvallis, OR (US); Mackensie Smith, Corvallis, OR (US); James McKinnell, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 771 days.

(21) Appl. No.: 17/637,477

(22) PCT Filed: Oct. 23, 2019

(86) PCT No.: PCT/US2019/057529
§ 371 (c)(1),
(2) Date: Feb. 23, 2022

(87) PCT Pub. No.: WO2021/080572
PCT Pub. Date: Apr. 29, 2021

(65) Prior Publication Data
US 2022/0274173 A1 Sep. 1, 2022

(51) Int. Cl.
*C22C 33/02* (2006.01)
*B22F 1/05* (2022.01)
(Continued)

(52) U.S. Cl.
CPC ........ *C22C 33/0285* (2013.01); *B22F 3/1007* (2013.01); *B22F 10/14* (2021.01);
(Continued)

(58) Field of Classification Search
CPC ..... C22C 33/0285; C22C 38/42; C22C 38/48; B22F 3/1007; B22F 10/14; B22F 1/05;
(Continued)

(56) References Cited

U.S. PATENT DOCUMENTS

2018/0243830 A1 8/2018 Kottilingam et al.
2019/0040481 A1* 2/2019 Goldsmith ............ C21D 6/007
(Continued)

FOREIGN PATENT DOCUMENTS

EP 3333275 A1 6/2018
RU 2350683 C1 3/2009
(Continued)

OTHER PUBLICATIONS

"Metal 3D Printing Materials & Binders," ExOne.com, Rev. 5, Retrieved at https://www.exone.com/en-US/3d-printing-materials-and-binders/metal-materials-binders, Sep. 10, 2019, 3 pages (Year: 2019).*
(Continued)

*Primary Examiner* — John A Hevey
(74) *Attorney, Agent, or Firm* — Dierker & Kavanaugh, P.C.

(57) ABSTRACT

Three-dimensional printing can include iteratively applying build material layers including stainless steel particles, iteratively applying a binding agent to individual build material layers to define individually patterned object layers that become adhered to one another to form a layered green body object, and sintering the layered green body object in a sintering oven. The stainless steel particles can include from about (2) wt % to about (6) wt % nickel, from about (14) wt % to about (19) wt % chromium, from about (2) wt % to about (6) wt % copper, and up to about (700) ppm carbon. Sintering can include ramping up the temperature to about (1240)° C. to about (1320)° C., pausing for about (30) minutes to about (12) hours, and ramping up the temperature to about (1350)° C. to about (1400)° C. for (10) minutes to about (6) hours.

13 Claims, 3 Drawing Sheets

(51) Int. Cl.

| | |
|---|---|
| ***B22F 3/10*** | (2006.01) |
| ***B22F 10/14*** | (2021.01) |
| ***B33Y 10/00*** | (2015.01) |
| ***B33Y 30/00*** | (2015.01) |
| ***B33Y 40/20*** | (2020.01) |
| ***B33Y 70/00*** | (2020.01) |
| ***C22C 38/42*** | (2006.01) |
| ***C22C 38/48*** | (2006.01) |

(52) U.S. Cl.
CPC ............... *B33Y 10/00* (2014.12); *B33Y 30/00* (2014.12); *B33Y 40/20* (2020.01); *B33Y 70/00* (2014.12); *C22C 38/42* (2013.01); *C22C 38/48* (2013.01); *B22F 1/05* (2022.01); *B22F 2301/35* (2013.01); *B22F 2304/10* (2013.01)

(58) Field of Classification Search
CPC .............. B22F 2301/35; B22F 2304/10; B22F 2998/10; B33Y 10/00; B33Y 30/00; B33Y 40/20; B33Y 70/00; B33Y 70/10; B29C 64/165; B29C 64/295; Y02P 10/25
See application file for complete search history.

(56) References Cited

U.S. PATENT DOCUMENTS

| | | | | |
|---|---|---|---|---|
| 2019/0111479 | A1* | 4/2019 | Kasperchik | B22F 10/16 |
| 2019/0210277 | A1* | 7/2019 | Sachs | B29C 64/209 |
| 2022/0178626 | A1* | 6/2022 | Aghababaie | B29C 64/129 |

FOREIGN PATENT DOCUMENTS

| | | | |
|---|---|---|---|
| WO | 2018/026962 | A1 | 2/2018 |
| WO | 2019/161214 | A1 | 8/2019 |

OTHER PUBLICATIONS

Hu et al., "Experimental investigation on selective laser melting of 17-4PH stainless steel," Optics & Laser Technology, vol. 87, Jan. 2017, pp. 17-25. (Year: 2017).*

"Metal 3D Printing Materials & Binders", ExOne.com, Rev. 5, Retrieved at https://www.exone.com/en-US/3d-printing-materials-and-binders/metal-materials-binders, Sep. 10, 2019, 3 pages.

* cited by examiner

THREE-DIMENSIONAL PRINTING WITH STAINLESS STEEL PARTICLES

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques are considered additive processes because they involve the application of successive layers of material. This is unlike other machining processes, which often rely upon the removal of material to create the final part. Some three-dimensional printing methods use chemical binders or adhesives to bind build materials together. Other three-dimensional printing methods involve partial sintering, melting, etc. of the build material. For some materials, partial melting may be accomplished using heat-assisted extrusion, and for some other materials curing or fusing may be accomplished using, for example, ultra-violet light or infrared light.

DETAILED DESCRIPTION

Figure 1:
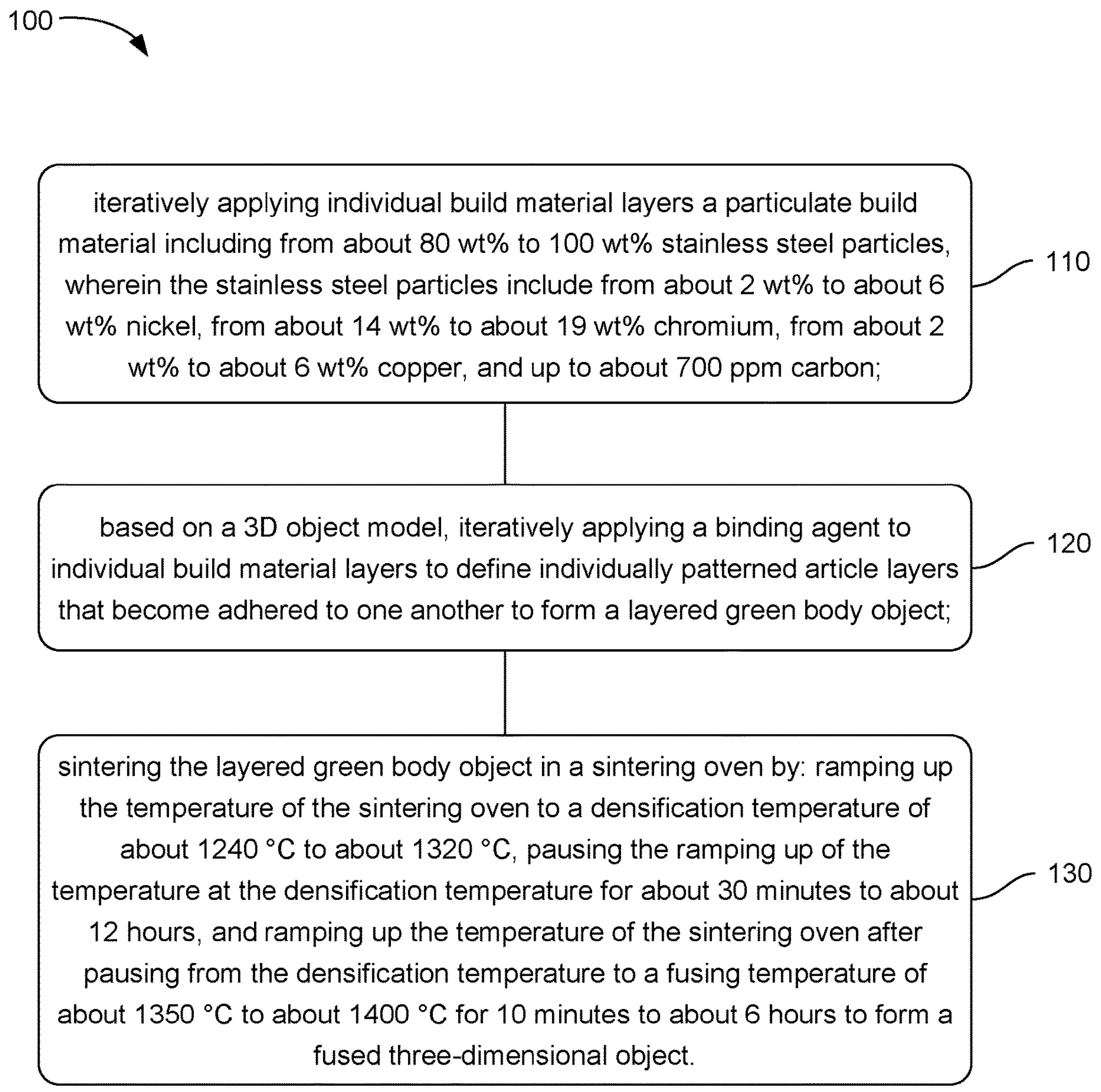
FIG. 1 is a flow diagram illustrating an example method of three-dimensional printing in accordance with the present disclosure.

Three-dimensional printing can be an additive process involving the application of successive layers of a particulate build material with binding agent printed thereon to bind the successive layers of the particulate build materials together. In some processes, application of a binding agent with a binder therein can be utilized to form a green body object or article and then a heat-fused three-dimensional object can be formed therefrom, such as by sintering, annealing, melting, etc. More specifically, a binding agent can be selectively applied to a layer of a particulate build material on a support bed, e.g., a build platform supporting particulate build material, to pattern a selected region of a layer of the particulate build material and then another layer of the particulate build material can be applied thereon. The binding agent can be applied again, and then repeated to form the green part (also known as a green body object or a green body article), which can then be heat-fused to form the fused three-dimensional object.

In three-dimensional printing with stainless steel particles small cavities, e.g. pores, can form in the green body object during printing. The quantity of pores can be related to the density of the heat-fused object formed therefrom. Green body objects that have large pores can lead to heat-fused objects that are less dense than objects formed from green body objects with smaller pores. Lower densities often lead to lower mechanical strength, including objects that are subject to material fatigue and/or cracking. Consistently achieving a condition of closed porosity in a sintered state can enhance mechanical strength and corrosion resistance of a fused three-dimensional object.

In accordance with this, a method of three-dimensional printing can include iteratively applying individual build material layers of a particulate build material including from about 80 wt % to 100 wt % stainless steel particles; based on a three-dimensional object model, iteratively applying a binding agent to individual build material layers to define individually patterned object layers that become adhered to one another to form a layered green body object; and sintering the layered green body object in a sintering oven. The stainless steel particles can include from about 2 wt % to about 6 wt % nickel, from about 14 wt % to about 19 wt % chromium, from about 2 wt % to about 6 wt % copper, and up to about 700 ppm carbon. The sintering can include ramping up a temperature of the sintering oven to a densification temperature of about 1240° C. to about 1320° C., pausing the ramping up of the temperature at the densification temperature for about 30 minutes to about 12 hours, and ramping up the temperature of the sintering oven after pausing from the densification temperature to a fusing temperature of about 1350° C. to about 1400° C. for 10 minutes to about 6 hours to form a fused three-dimensional object. In an example, the stainless steel particles can have a D50 particle size from about 6 μm to about 25 μm. In another example, the stainless steel particles can include from about 3 wt % to about 5 wt % nickel, from about 15 wt % to about 17 wt % chromium, from about 3 wt % to about 5 wt % copper, and from about 0.15 wt % to about 0.45 wt % niobium, tantalum, or a combination of niobium and tantalum. In a further example, the sintering can occur in an atmosphere including from about 1 wt % to 100 wt % hydrogen gas. In one example, the sintering can include reducing the pressure in a sintering oven to a vacuum ranging from about 1 Torr to about 730 Torr. In another example, the fused three-dimensional object can have from about 0.5% to about 5% porosity by volume. In yet another example, the fused three-dimensional object can have a density ranging from about 7.5 g/cm$^3$ to about 7.8 g/cm$^3$. In a further example, the ramping up of the temperature of the sintering oven to a densification temperature and ramping up the temperature from the densification temperature to the fusing temperature can occur at an average rate of about 2° C. to about 20° C. per minute.

In another example, a three-dimensional printing kit ("kit) is presented. The kit can include a binding agent including a binder particles dispersed in a liquid vehicle; and a particulate build material including from about 80 wt % to 100 wt % stainless steel particles. The stainless steel particles can include from about 2 wt % to about 6 wt % nickel, from about 14 wt % to about 19 wt % chromium, from about 2 wt % to about 6 wt % copper, and up to about 700 ppm carbon. In an example, the stainless steel particles can have a D50 particle size from about 6 μm to about 25 μm. In one example, the stainless steel particles have a D90 particle size from about 10 μm to about 35 μm. In another example, the stainless steel particles can include from about 3 wt % to about 5 wt % nickel, from about 15 wt % to about 17 wt % chromium, from about 3 wt % to about 5 wt % copper, and from about 0.15 wt % to about 0.45 wt % niobium, tantalum, or a combination of niobium and tantalum.

In a further example, a three-dimensional printing system ("system") is presented. The system can include a particulate build material including from about 80 wt % to 100 wt % stainless steel particles including from about 2 wt % to about 6 wt % nickel, from about 14 wt % to about 19 wt % chromium, from about 2 wt % to about 6 wt % copper, and up to about 700 ppm carbon; a binding agent applicator fluidly coupled or coupleable to a binding agent to iteratively apply the binding agent to the particulate build material to form individually patterned object layers of a green body object; a sintering oven to receive and heat the green body object to cause the green body object to become fused; and a hardware controller. The hardware controller can generate a command to ramp up the temperature of the sintering oven to a densification temperature of about 1240° C. to about 1320° C., pause the ramping up of the temperature at the densification temperature for about 30 minutes to about 12 hours, and ramp up the temperature of the sintering oven after pausing from the densification temperature to a fusing temperature of about 1350° C. to about 1400° C. for 10 minutes to about 6 hours to form a fused three-dimensional object. In an example, the system can further include a binding agent applicator that can be fluidly coupled or coupleable to the binding agent to iteratively apply the binding agent to the particulate build material to form the individually patterned object layers of the green body object. In another example, the system can further include a build platform to support the particulate build material, in that the build platform is positioned to receive the binding agent from the binding agent applicator onto a layer of the particulate build material.

When discussing the method of three-dimensional printing, the three-dimensional printing kit, and/or the three-dimensional printing system herein, these discussions can be considered applicable to one another whether or not they are explicitly discussed in the context of that example. Thus, for example, when discussing stainless steel particles related to a method of three-dimensional printing, such disclosure is also relevant to and directly supported in the context of the three-dimensional printing kit, the three-dimensional printing system, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Methods of Three-Dimensional Printing

A flow diagram of an example method 100 of three-dimensional (3D) printing is shown in FIG. 1. The method can include iteratively applying 110 individual build material layers of a particulate build material including from about 80 wt % to 100 wt % stainless steel particles; based on a three-dimensional object model, iteratively applying 120 a binding agent to individual build material layers to define individually patterned object layers that become adhered to one another to form a layered green body object; and sintering 130 the layered green body object in a sintering oven. The stainless steel particles can include from about 2 wt % to about 6 wt % nickel, from about 14 wt % to about 19 wt % chromium, from about 2 wt % to about 6 wt % copper, and up to about 700 ppm carbon. The sintering can include ramping up a temperature of the sintering oven to a densification temperature of about 1240° C. to about 1320° C., pausing the ramping up of the temperature at the densification temperature for about 30 minutes to about 12 hours, and ramping up the temperature of the sintering oven after pausing from the densification temperature to a fusing temperature of about 1350° C. to about 1400° C. for 10 minutes to about 6 hours to form a fused three-dimensional object.

In printing in a layer-by-layer manner, the particulate build material can be spread, the binding agent applied, and then the build platform can then be dropped a distance of "x," which in one example can be 5 μm to 1 mm, which can correspond to the thickness of a printed layer of the green body object, so that another layer of the particulate build material can be added again thereon to receive another application of binding agent, and so forth. This process can be repeated on a layer by layer basis until the entire green body object is formed. A "green" body object (or individual layer) can refer to any component or mixture of components that are not yet sintered or annealed, but which are held together in a manner sufficient to permit heat-fusing, e.g., handling, moving, or otherwise preparing the part for heat-fusing. During the build, in one example, heat can be applied from overhead and/or can be provided by the build platform from beneath the particulate build material to drive off water and/or other liquid components, as well as to further solidify the layer of the green body object. In other examples, the particulate build material can be heated prior to dispensing.

Following the formation of the green body object, the object can be moved to an oven and fused by sintering and/or annealing. The term "sinter" or "sintering" refers to the consolidation and physical bonding of the stainless steel particles together (after temporary binding using the binding agent) by solid state diffusion bonding, partial melting of stainless steel particles, or a combination of solid state diffusion bonding and partial melting. The term "anneal" or "annealing" refers to a heating and cooling sequence that controls the heating process and the cooling process, e.g., slow cooling in some instances can remove internal stresses and/or toughen the heat-fused part or object In one example, the sintering can occur in an oven that can include hydrogen gas. For example, the sintering oven can include from about 1 wt % to 100 wt %, from about 25 wt % to about 75 wt %, or from about 90 wt % to about 100 wt % hydrogen gas. In further examples, the sintering can include reducing a sintering oven to a vacuum that can range about 1 Torr to about 730 Torr, or from about 250 Torr to 600 Torr.

A temperature of the sintering can occur in three heating phases. The phases can include an initial phase of ramping up a temperature of the sintering oven to a densification temperature of about 1240° C. to about 1320° C. The intermediate phase can include a pause in the sintering at a temperature ranging from about 1240° C. to about 1320° C. for about 30 minutes to about 12 hours. The pause includes holding a temperature of the sintering in the range from about 1240° C. to about 1320° C. for the period of the intermediate phase. The final phase can include ramping up the temperature of the sintering oven after pausing from the densification temperature to a fusing temperature of about 1350° C. to about 1400° C. for 10 minutes to about 6 hours to form a fused three-dimensional object. An amount of time to reach the desired sintering temperature can be dependent on oven insulation, mass of metal in the oven, an atmosphere of the open space, and the ramping speed. In one example, a ramping of the temperature in the initial phase and the final phase can occur at an average rate of from about 2° C. to about 20° C. per minute, from about 5° C. to about 10° C. per minute, or from about 7° C. to about 15° C. per minute.

The intermediate phase, as noted above, can include a pause in the sintering at a temperature ranging from about 1240° C. to about 1320° C. for about 30 minutes to about 12 hours. Pausing within a temperature range of from about 1240° C. to about 1320° C. can also coincide with the formation of delta ferrite along the prior particle boundaries which can further aid in densification of the green body object. The pause can also reduce grain boundary migration and grain growth. In some examples, the pause in sintering can occur at a temperature range from about 1300° C. to about 1320° C. or from about 1290° C. to about 1310° C. and can occur for a time period that can range from about 1 hour to about 8 hours, from about 2 hours to about 7 hours, from about 4 hours to about 6 hours, from about 4 hours to 8 hours, or from about 5 hours to about 10 hours.

In some examples, the method can result in a fused three-dimensional object that can have a porosity ranging from about 0.5% to about 5% by volume or from about 1% to about 3% by volume. This can be verified or confirmed by measuring the bulk material surface area minus the area of the open pores, which can approximate the volumetric porosity. Alternatively, porosity of the three-dimensional object can be determined by water displacement. In other examples, the method can result in a fused three-dimensional has a density ranging from about 7.5 g/cm$^3$ to about 7.8 g/cm$^3$ or from about 7.6 g/cm$^3$ to about 7.7 g/cm$^3$.

Three-Dimensional Printing Kits

Figure 2:
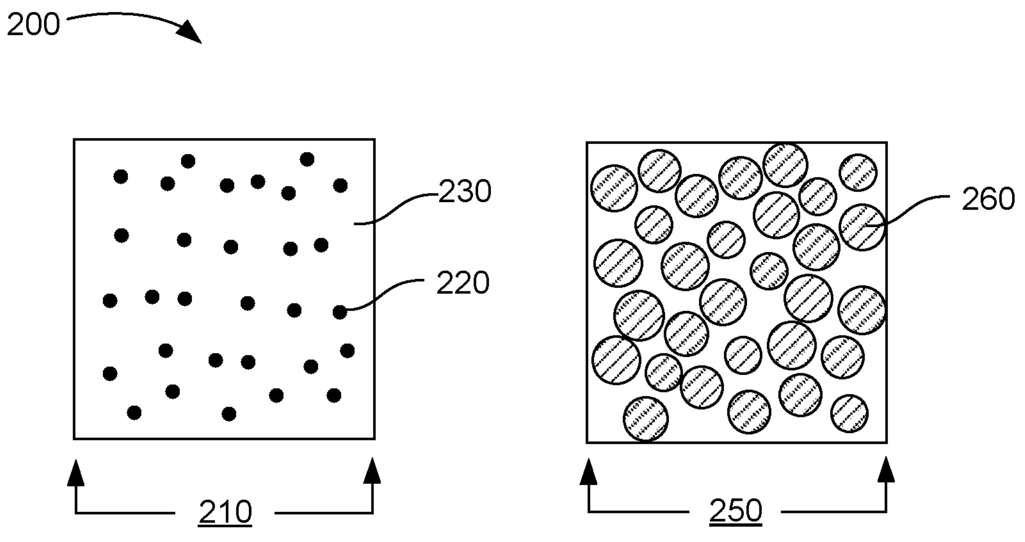
FIG. 2 graphically illustrates an example three-dimensional printing kit in accordance with the present disclosure.

In accordance with examples of the present disclosure, a three-dimensional (3D) printing kit 200 is shown in FIG. 2. The three-dimensional printing kit can include a binding agent 210 and a particulate build material 250. The binding agent can include binder particles 220 in a liquid vehicle 230. The particulate build material can include, from about 80 wt % to 100 wt % stainless steel particles 260, wherein the stainless steel particles include from about 2 wt % to about 6 wt % nickel, from about 14 wt % to about 19 wt % chromium, from about 2 wt % to about 6 wt % copper, and up to about 700 ppm carbon. The particulate build material may be packaged or co-packaged with the binding agent in separate containers, and/or can be combined with the binding agent at the time of printing, e.g., loaded together in a three-dimensional printing system.

Three-Dimensional Printing System

Figure 3:
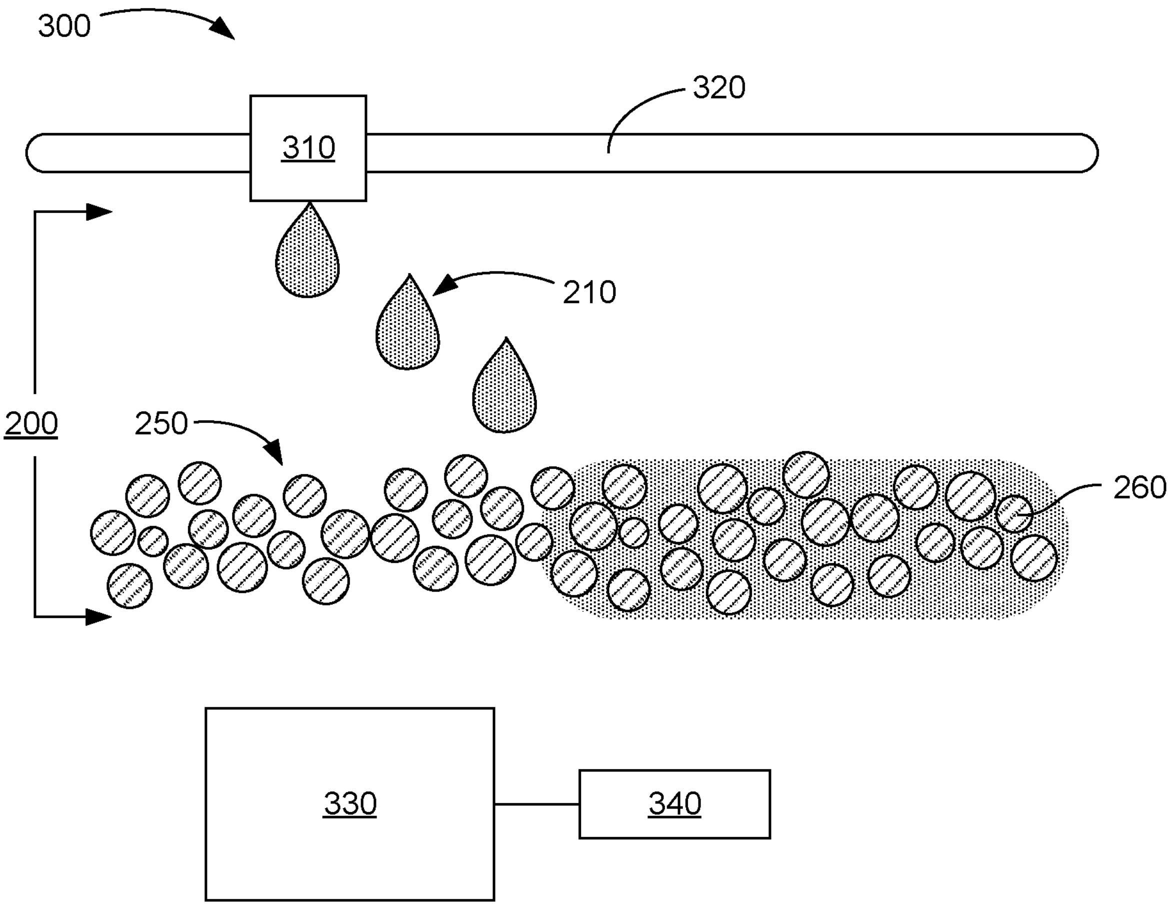
FIG. 3 graphically illustrates an example three-dimensional printing system in accordance with the present disclosure.

A three-dimensional printing system 300 is illustrated by way of example in FIG. 3. The three-dimensional printing system can include a three-dimensional printing kit 200, which includes a particulate build material 250, a binding agent 210, a sintering oven 330, and a hardware controller 340. The hardware controller can generate a command to control the temperature ramping of the sintering oven, for example. The particulate build material can include from about 80 wt % to 100 wt % stainless steel particles 260. The stainless steel particles can include from about 2 wt % to about 6 wt % nickel, from about 14 wt % to about 19 wt % chromium, from about 2 wt % to about 6 wt % copper, and up to about 700 ppm carbon.

In some examples, the system can further include a binding agent applicator 310, such as a digital fluid ejector, e.g., thermal or piezo jetting architecture. The binding agent applicator can be fluidly coupled or coupleable to the binding agent to iteratively apply the binding agent to the particulate build material to form individually patterned object layers of a green body object. In the example illustrated in FIG. 3, the binding agent applicator is shown on a carriage track 320, but could be supported by any of a number of structures. The binding agent applicator can be fluidly coupled or coupleable to the binding agent and directable to apply the binding agent to the particulate build material to form a layered green body object. The binding agent applicator can be any type of apparatus capable of selectively applying the binding agent. For example, the binding agent applicator can be a fluid ejector or digital fluid ejector, such as an inkjet printhead, e.g., a piezo-electric printhead, a thermal printhead, a continuous printhead, etc. The binding agent applicator could likewise be a sprayer, a dropper, or other similar structure for applying the binding agent to the particulate build material. Thus, in some examples, the application can be by jetting or ejecting from a digital fluid jet applicator, similar to an inkjet pen. In yet another example, the binding agent applicator can include a motor and can be operable to move back and forth over the particulate build material along a carriage when positioned over or adjacent to a powder bed of a build platform.

The sintering oven can be configured to receive and heat the green body object (formed from the particulate build material with binding agent applied thereto) and to cause the green body object to become fused. In some examples, the sintering oven can be configured to include a controlled atmosphere. In some examples, the controlled atmosphere can include an inert atmosphere of a noble gas, an inert gas, a reactive gas, or a combination thereof. In another example, the sintering oven can be associated with a vacuum. The vacuum can be configured to alter a pressure of the sintering oven.

The hardware controller can generate a command to ramp up the temperature of the sintering oven to a densification temperature of about 1240° C. to about 1320° C., pause the ramping up of the temperature at the densification temperature for about 30 minutes to about 12 hours, and ramp up the temperature of the sintering oven after pausing from the densification temperature to a fusing temperature of about 1350° C. to about 1400° C. for about 10 minutes to about 6 hours to form a fused three-dimensional object.

Figure 4:
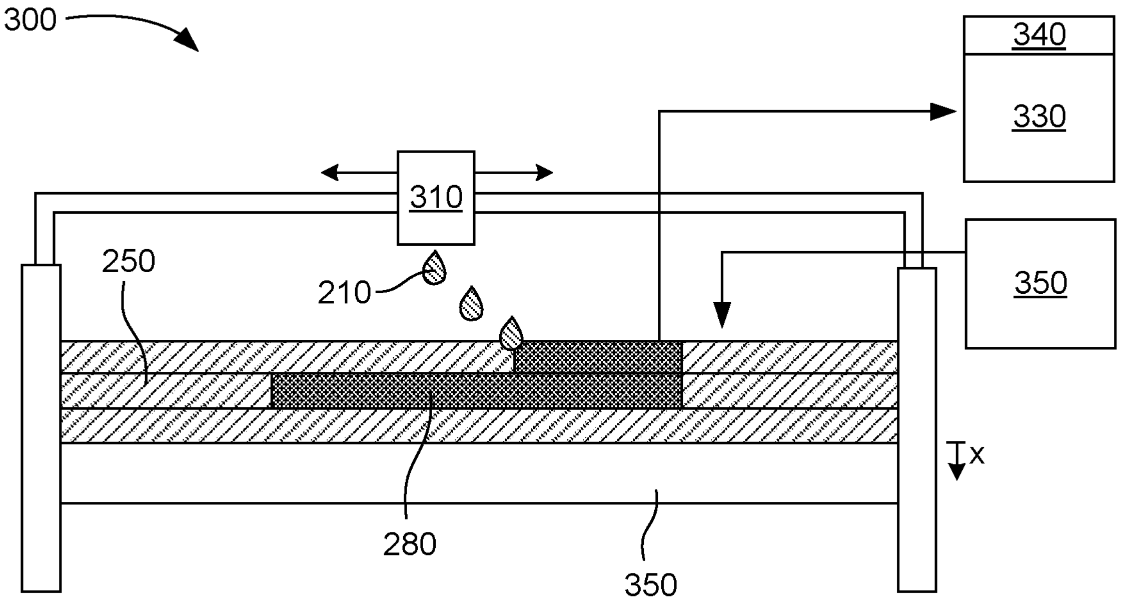
FIG. 4 graphically illustrates an example three-dimensional printing system in accordance with the present disclosure.

In an example, other aspects of the three-dimensional printing system 300 are shown in FIG. 4, including a build platform 350 to support the particulate build material 250. The build platform can be positioned to receive the binding agent 210 from the binding agent applicator 310 onto a layer of the particulate build material. The build platform can be configured to drop in height (shown at "x"), thus allowing for successive layers of particulate build material to be applied by a supply and/or spreader 350. The particulate build material can be layered in the build platform at a thickness that can range from about 5 μm to about 1 mm. In some examples, individual layers can have a relatively uniform thickness. In one example, a thickness of a layer of the particulate build material can range from about 10 μm to about 500 μm, or from about 30 μm to about 200 μm. The green body object 280 can then be transferred to the sintering oven 340, which includes or is electrically associated with a hardware controller 340 that controls the temperature up the temperature as described previously.

Binding Agents

In further detail, regarding the binding agent 210 that may be utilized in the method of three-dimensional (3D) or present in the three-dimensional printing kit or the three-dimensional printing system, as described herein, the binding agent can include binder particles 220 and a liquid vehicle 230. The term "binder particles" can include any material used to physically bind separate stainless steel particles together or facilitate adhesion to a surface of adjacent stainless steel particles in order to prepare a green part or green body object in preparation for subsequent heat-fusing, e.g., sintering, annealing, melting, etc. During three-dimensional printing, a binding agent can be applied to the particulate build material on a layer by layer basis. The liquid vehicle of the binding agent can be capable of wetting a particulate build material and the binder particles can move into vacant spaces between stainless steel particles of the particulate build material, for example.

The binding agent can provide binding to the particulate build material upon application, or in some instances, can be activated after application to provide binding. The binder particles can be activated or cured by heating the binder particles (which may be accomplished by heating an entire layer of the particulate build material on a portion of the binding agent which has been selectively applied). If the binder particles include a polymer binder, then this may occur at about the glass transition temperature of the polymer binder particles, for example. When activated or cured, the binder particles can form a network that can adhere or glue the stainless steel particles of the particulate build material together, thus providing cohesiveness in forming and/or holding the shape of the green body object or a printed layer thereof.

Thus, in one example, the green body object can have the mechanical strength to withstand extraction from a powder bed and can then be sintered or annealed to form a heat-fused object. Once the green body object is sintered or annealed, that object is then herein referred to as a “fused” three-dimensional object, part, or article. In some examples, the binder particles contained in the binding agent can undergo a pyrolysis or burnout process, from 250° C. to 700° C., where the binder particles may be removed during sintering or annealing. This can occur where the thermal energy applied to a green body part or object removes inorganic or organic volatiles and/or other materials that may be present either by decomposition or by burning the binding agent. In other examples, if the binder particles include a metal, such as a reducible metal compound, the metal binder may remain with the heat-fused object after sintering or annealing.

The binder particles can be included, as mentioned, in a liquid vehicle for application to the particulate build material. For example, the binder particles can be present in the binding agent at from about 1 wt % to about 50 wt %, from about 2 wt % to about 30 wt %, from about 5 wt % to about 25 wt %, from about 10 wt % to about 20 wt %, from about 7.5 wt % to about 15 wt %, from about 15 wt % to about 30 wt %, from about 20 wt % to about 30 wt %, or from about 2 wt % to about 12 wt % in the binding agent.

In one example, the binder particles can include polymer particles, such as latex polymer particles. The polymer particles can have an average particle size that can range from about 100 nm to about 1 µm. In other examples, the polymer particles can have an average particle size that can range from about 150 nm to about 300 nm, from about 200 nm to about 500 nm, or from about 250 nm to 750 nm.

In one example, the latex particles can include any of a number of copolymerized monomers, and may in some instances include a copolymerized surfactant, e.g., polyoxyethylene compound, polyoxyethylene alkylphenyl ether ammonium sulfate, sodium polyoxyethylene alkylether sulfuric ester, polyoxyethylene styrenated phenyl ether ammonium sulfate, etc. The copolymerized monomers can be from monomers, such as styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, or combinations thereof. In some examples, the latex particles can include an acrylic. In other examples, the latex particles can include 2-phenoxyethyl methacrylate, cyclohexyl methacrylate, cyclohexyl acrylate, methacrylic acid, combinations thereof, derivatives thereof, or mixtures thereof. In another example, the latex particles can include styrene, methyl methacrylate, butyl acrylate, methacrylic acid, combinations thereof, derivatives thereof, or mixtures thereof.

With respect to the liquid vehicle, binding agent can include from about 50 wt % to about 99 wt %, from about 70 wt % to about 98 wt %, from about 80 wt % to about 98 wt %, from about 60 wt % to about 95 wt %, or from about 70 wt % to about 95 wt % liquid vehicle, based on the weight of the binding agent as a whole. In one example, the liquid vehicle can include water as a major solvent, e.g., the solvent present at the highest concentration when compared to other co-solvents. In another example, the liquid vehicle can further include from about 0.1 wt % to about 70 wt %, from about 0.1 wt % to about 50 wt %, or from about 1 wt % to about 30 wt % of liquid components other than water. The other liquid components can include organic co-solvent, surfactant, additive that inhibits growth of harmful microorganisms, viscosity modifier, pH adjuster, sequestering agent, preservatives, etc.

When present, organic co-solvent(s) can include high-boiling solvents and/or humectants, e.g., aliphatic alcohols, aromatic alcohols, alkyl diols, glycol ethers, polyglycol ethers, 2-pyrrolidinones, caprolactams, formamides, acetamides, C6 to C24 aliphatic alcohols, e.g., fatty alcohols of medium (C6-C12) to long (C13-C24) chain length, or mixtures thereof. The organic co-solvent(s) in aggregate can be present from 0 wt % to about 50 wt % in the binding agent. In other examples, organic co-solvents can be present at from about 5 wt % to about 25 wt %, from about 2 wt % to about 20 wt %, or from about 10 wt % to about 30 wt % in the binding agent.

Particulate Build Materials

The particulate build material can include from about 80 wt % to 100 wt %, from about 90 wt % to 100 wt %, from about 95 wt % to 100 wt %, or from about 99 wt % to 100 wt % stainless steel particles. The stainless steel particles can have a D50 particle size from about 6 µm to about 25 µm, from about 8 µm to about 18 µm, or from about 10 µm to about 14 µm. The stainless steel particles can have a D90 particle size that can be less than about 35 µm, about 30 µm, about 25 µm, or about 20 µm. In other examples, the stainless steel particles can have a D90 particle size that can range from about 10 µm to about 35 µm, from about 15 µm to about 30 µm, or from about 10 µm to about 25 µm. As used herein, particle size can refer to a value of the diameter of spherical particles or in particles that are not spherical can refer to the equivalent spherical diameter of that particle. The particle size can be in a Gaussian distribution or a Gaussian-like distribution (or normal or normal-like distribution). Gaussian-like distributions are distribution curves that can appear Gaussian in distribution curve shape, but which can be slightly skewed in one direction or the other (toward the smaller end or toward the larger end of the particle size distribution range). In these or other types of particle distributions, the particle size can be characterized in one way using the 50$^{th}$ percentile of the particle size, sometimes referred to as the "D50" particle size. For example, a D50 value of about 25 μm means that about 50% of the particles (by volume) have a particle size greater than about 25 μm and about 50% of the particles have a particle size less than about 25 μm. Whether the particle size distribution is Gaussian, Gaussian-like, or otherwise, the particle size distribution can be expressed in terms of D50 particle size, which may usually approximate average particle size, but may not be the same. In examples herein, the particle size ranges can be modified to "average particle size," providing sometimes slightly different size distribution ranges.

The stainless steel particles can include from about 2 wt % to about 6 wt % nickel, from about 14 wt % to about 19 wt % chromium, from about 2 wt % to about 6 wt % copper, and up to about 700 ppm carbon (from about 0.01 wt % to about 0.07 wt % carbon content). Stainless steel particles with low carbon content, or particularly extra low carbon content, can exhibit corrosion resistance and can be tougher than comparable stainless steel particles that incorporate a higher carbon content in the context of forming metal objects in accordance with the three-dimensional printing and fusing technologies described herein. In another example, the stainless steel particles can include from about 3 wt % to about 5 wt % nickel, from about 15 wt % to about 18 wt % chromium, from about 3 wt % to about 5 wt % copper, and up to about 700 ppm carbon. In yet another example, the stainless steel particles include from about 3 wt % to about 5 wt % nickel, from about 15 wt % to about 17 wt % chromium, and from about 3 wt % to about 5 wt % copper. In some examples, the stainless steel particles can further include from about 0.15 wt % to about 0.45 wt % niobium, tantalum, or a combination of niobium and tantalum. In another example, the stainless steel particles can further include from 0 wt % to about 2 wt % or from about 0.01 wt % to about 2 wt % manganese, from 0 wt % to about 0.1 wt % or from about 0.01 wt % to about 0.07 wt % phosphorus, from 0 wt % to about 0.05 wt % or from about 0.01 wt % to about 0.08 wt % sulfur, and/or from 0 wt % to about 2 wt % or from about 0.01 wt % to about 2 wt % silicon. In an example, the stainless steel particles can include 17-4PH, 15-5PH, or a mixture of 17-4PH and 15-5PH particles.

The stainless steel particles can include austenitic stainless steel particles, ferritic stainless steel particles, martensitic steel particles, amorphous steel particles, or a combination thereof. As used herein, "austenitic" refers to an atomic arrangement that is a face-centered cubic crystal with one atom at individual corners of the crystal cube and one atom in the middle of individual faces of the crystal cube. As used herein, "ferritic" steels can have an atomic arrangement that is a body-centered cubic grain structure with a cubic atom cell that includes one atom in the center.

The stainless steel particles can be spherical, irregular spherical, rounded, semi-rounded, discoidal, angular, subangular, cubic, cylindrical, or any combination thereof. In one example, stainless steel particles can include spherical particles, irregular spherical particles, or rounded particles. In some examples, the shape of the stainless steel particles can be uniform, which can allow for relatively uniform melting or sintering of the particles.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, the "green" is used to describe any of a number of intermediate structures prior to particle to particle material fusing, e.g., green body object, green body article, green body layer, etc. As a "green" structure, the particulate build material can be (weakly) bound together by a binder. Typically, a mechanical strength of the green body is such that the green body can be handled or extracted from a particulate build material on build platform to place in a sintering oven, for example. It is to be understood that any particulate build material that is not patterned with the binding agent is not considered to be part of the "green" structure, even if the particulate build material is adjacent to or surrounds the green body object or layer thereof. For example, unprinted particulate build material can act to support the green body object while contained therein, but the particulate build material is not part of the green structure unless the particulate build material is printed with a binding agent or some other fluid that is used to generate a solidified part prior to fusing, e.g., sintering, annealing, melting, etc.

As used herein, "kit" can be synonymous with and understood to include a plurality of compositions including multiple components where the different compositions can be separately contained (though in some instances co-packaged in separate containers) prior to use, but these components can be combined together during use, such as the three-dimensional object build processes described herein. The containers can be any type of a vessel, box, or receptacle made of any material.

As used herein, "applying" when referring to binding agent that may be used, for example, refers to any technology that can be used to put or place the fluid agent, e.g., binding agent, on the particulate build material or into a layer of particulate build material for forming a green body object. For example, "applying" may refer to "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as up to about 20 picoliters, up to about 30 picoliters, or up to about 50 picoliters, etc. Example ranges may include from about 2 picoliters to about 50 picoliters, or from about 3 picoliters to about 12 picoliters.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

The following illustrates an example of the present disclosure. However, it is to be understood that the following is only illustrative of the application of the principles of the present disclosure. Numerous modifications and alternative compositions, methods, and systems may be devised without departing from the present disclosure. The appended claims are intended to cover such modifications and arrangements.

EXAMPLE

Multiple heat-fused three-dimensional objects were prepared using a layer-by-layer powder bed printing process. Specifically, two different fusing temperature profiles were used to generate a comparison of object densities after sintering. For this example, all of the particulate build materials selected for use included from 97 wt % to 99.8 wt % 17-4PH stainless steel particles. Thus, a Control Fused Object was prepared and an Example Fused Object was prepared. The Control fused Object used a single sintering temperature. The Example Fused Object used multiple heating stages, including multiple ramping up phases and a pause in temperature ramp up therebetween. Both types of fused objects were prepared as follows:

1) Particulate build material was spread evenly on a build platform at an average thickness of about 70 μm to form a build material layer.
2) Binding agent including latex binder was selectively applied to portions of the build material layer at a latex polymer particle to particulate build material weight ratio of about 1:99.
3) The spreading of the particulate build material (1) and the application of the binding agent (2) was then repeated until a green body object was formed having multiple layers.
4) The respective green body objects were then removed from the particulate build material and transferred to a fusing oven for sintering.
5) One of the green body objects was sintered in the fusing oven in three phases. Specifically, fusing included ramping up the temperature of the fusing oven to a densification temperature of about 1300° C. After ramping up to the densification temperature, the temperature was paused there for about 5 hours. Then, ramping up of the temperature of the fusing oven was resumed to reach a fusing temperature of about 1350° C. to about 1400° C. for about 2 additional hours to form a fused three-dimensional object, which was the Example Fused Object.
6) Another green body object was sintered in the fusing oven at a temperature ranging of about 1370° C. for six hours to form a fused three-dimensional object, which was the Control Fused Object, prepared for comparison purposes with respect to density.
7) Following controlled cooling, two heat-fused stainless steel objects were formed and density values were measured using Archimedes methods.

The Control Fused Object had an equiaxed structure with about 7% overall pore area along the surface, and thus, the surface density of Control Fused Object was about 93%. The Example Fused Object, on the other hand, had an elongated grain structure with about 2% overall pore area along the surface, and thus, the surface density was about 98%. The reduction in the overall pore area of the Example Fused Object indicates that this particular object had good mechanical properties when compared to the Control Fused Object. Pausing the temperature ramp at a densification temperature (lower than the final fusing temperature), e.g., about 1300° C., thus reduced the overall pore volume (as evidenced by the surface area densities), thereby increasing the overall density of the fused three-dimensional object.

What is claimed is:

1. A method of three-dimensional printing, the method comprising:
- iteratively applying individual build material layers of a particulate build material including from about 97 wt % to 99.8 wt % of stainless steel particles, wherein the stainless steel particles include:
  - from about 2 wt % to about 6 wt % of nickel;
  - from about 14 wt % to about 19 wt % of chromium;
  - from about 0.01 wt % to about 0.07 wt % of phosphorus;
  - from about 0.01 wt % to about 0.08 wt % of sulfur;
  - from about 2 wt % to about 6 wt % of copper; and
  - up to about 700 ppm of carbon;
- based on a three-dimensional object model, iteratively applying a binding agent to the individual build material layers to define individually patterned object layers that become adhered to one another to form a layered green body object; and
- sintering the layered green body object in a sintering oven by:
  - ramping up a temperature of the sintering oven to a densification temperature of from about 1290° C. to about 1310° C.;
  - pausing the ramping up of the temperature at the densification temperature for about 4 hours to about 8 hours; and
  - ramping up the temperature of the sintering oven after the pausing from the densification temperature to a fusing temperature of from about 1350° C. to about 1400° C. for about 10 minutes to about 6 hours to form a fused three-dimensional object,
- wherein the fused three-dimensional object has an increased surface density compared to that of another three-dimensional object formed from the particulate build material and fused in the sintering oven at a constant fusing temperature.

2. The method of claim 1, wherein the stainless steel particles have a D50 particle size of from about 6 μm to about 25 μm.

3. The method of claim 1, wherein the stainless steel particles include:
- from about 3 wt % to about 5 wt % of the nickel;
- from about 15 wt % to about 17 wt % of the chromium;
- from about 3 wt % to about 5 wt % of the copper; and
- from about 0.15 wt % to about 0.45 wt % of niobium, tantalum, or a combination of niobium and tantalum.

4. The method of claim 1, wherein sintering occurs in an atmosphere including from about 1 wt % to 100 wt % of hydrogen gas.

5. The method of claim 1, wherein the sintering includes reducing the pressure in a sintering oven to a vacuum ranging from about 1 Torr to about 730 Torr.

6. The method of claim 1, wherein the fused three-dimensional object has from about 0.5% to about 5% of porosity by volume.

7. The method of claim 1, wherein the fused three-dimensional object has a density ranging from about 7.5 $g/cm^3$ to about 7.8 $g/cm^3$.

8. The method of claim 1, wherein the ramping up of the temperature of the sintering oven to the densification temperature and the ramping up of the temperature from the densification temperature to the fusing temperature occurs at an average rate of about 2° C. to about 20° C. per minute.

9. The method of claim 1, wherein the stainless steel particles have a D90 particle size of from about 10 μm to about 35 μm.

10. The method of claim 1, wherein the binding agent includes binder particles dispersed in a liquid vehicle.

11. The method of claim 1, further comprising cooling the three-dimensional object after the sintering.

12. The method of claim 1, wherein the stainless steel particles further include:

from about 0.01 wt % to about 2 wt % of manganese; or from about 0.01 wt % to about 2 wt % silicon; or a combination thereof.

13. The method of claim 1, wherein the stainless steel particles include:

from about 0.05 wt % to about 0.07 wt % of the phosphorus; and from about 0.04 wt % to about 0.08 wt % of the sulfur.

* * * * *